US012580307B2

(12) United States Patent
Chivukula et al.

(10) Patent No.: US 12,580,307 B2
(45) Date of Patent: Mar. 17, 2026

(54) SCALABLE ELECTRONICALLY STEERABLE ANTENNA FOR L-BAND COMMUNICATION

(71) Applicant: Honeywell International Inc., Charlotte, NC (US)

(72) Inventors: Rajesh Chivukula, Bangalore (IN); David Muirhead, Cheltenham (GB); Sean McGinnis, Cambridge (CA); Sam Barrett, Bromsgrove (GB)

(73) Assignee: HONEYWELL INTERNATIONAL INC., Charlotte, NC (US)

( * ) Notice: Subject to any disclaimer, the term of this patent is extended or adjusted under 35 U.S.C. 154(b) by 446 days.

(21) Appl. No.: 18/158,610

(22) Filed: Jan. 24, 2023

(65) Prior Publication Data

US 2024/0195060 A1 Jun. 13, 2024

(30) Foreign Application Priority Data

Dec. 9, 2022 (IN) ............................. 202211071186

(51) Int. Cl.
*H01Q 3/26* (2006.01)
*H01Q 1/02* (2006.01)
(Continued)

(52) U.S. Cl.
CPC ................. *H01Q 3/26* (2013.01); *H01Q 1/48* (2013.01); *H01Q 9/0407* (2013.01); *H01Q 21/065* (2013.01); *H01Q 1/02* (2013.01)

(58) Field of Classification Search
CPC .......... H01Q 3/26; H01Q 1/48; H01Q 9/0407; H01Q 1/02; H01Q 9/0414; H01Q 21/065;
(Continued)

(56) References Cited

U.S. PATENT DOCUMENTS 4,791,423 A * 12/1988 Yokoyama ............. H01Q 5/378 343/702
5,160,936 A 11/1992 Braun et al.
(Continued)

FOREIGN PATENT DOCUMENTS

CN 111834747 A 10/2020
CN 212783801 U 3/2021
(Continued)

OTHER PUBLICATIONS

Delos et al., "Phased Array Antenna Patterns—Part 2: Grating Lobes and Beam Squint", 2020.*
(Continued)

*Primary Examiner* — Hoang V Nguyen
*Assistant Examiner* — Anna N Hamadyk
(74) *Attorney, Agent, or Firm* — Alston & Bird LLP

(57) ABSTRACT

An electronically steerable antenna for L-band satellite communication, the antenna comprising: a patch antenna including: four antenna elements spaced apart in a patch plane to form a two-by-two grid with a spacing between each antenna element of less than a half wavelength, a ground plane, and one or more controllers configured to apply difference beam steering to the four antenna elements; and a crossed metallic fence electrically connected to the ground plane and extending through the patch plane between the four antenna elements to separate the four antenna elements into respective quadrants in the two-by-two grid.

19 Claims, 8 Drawing Sheets

(51) Int. Cl.

| | |
|---|---|
| ***H01Q 1/48*** | (2006.01) |
| ***H01Q 9/04*** | (2006.01) |
| ***H01Q 21/06*** | (2006.01) |

(58) Field of Classification Search

CPC .. H01Q 3/00; H01Q 3/30; H01Q 3/24; H01Q 1/526; H01Q 1/52; H01Q 9/0421; H01Q 21/061; H01Q 19/005; H01Q 5/378; H01Q 21/0025; H01Q 1/422; H01Q 21/29; H01Q 25/02

See application file for complete search history.

(56) References Cited

U.S. PATENT DOCUMENTS

| | | | | |
|---|---|---|---|---|
| 6,218,989 | B1 * | 4/2001 | Schneider | H01Q 1/523 343/700 MS |
| 6,650,291 | B1 | 11/2003 | West et al. | |
| 7,068,222 | B2 | 6/2006 | Koparan et al. | |
| 7,427,967 | B2 | 9/2008 | Hughes | |
| 8,462,071 | B1 | 6/2013 | Rudish et al. | |
| 10,103,441 | B2 | 10/2018 | Legare | |
| 10,381,725 | B2 | 8/2019 | Iancu et al. | |
| 11,139,550 | B2 | 10/2021 | Yang | |
| 11,476,578 | B2 | 10/2022 | Chivukula | |
| 11,495,881 | B1 * | 11/2022 | Harvey | H01Q 1/02 |
| 2011/0215985 | A1 * | 9/2011 | Kaplan | H01Q 21/08 343/879 |
| 2013/0082890 | A1 * | 4/2013 | Wang | H01Q 1/48 343/810 |
| 2015/0015453 | A1 | 1/2015 | Puzella et al. | |
| 2021/0210855 | A1 * | 7/2021 | Yue | H01Q 13/02 |
| 2021/0223380 | A1 * | 7/2021 | Chi | G01S 13/781 |
| 2022/0302603 | A1 | 9/2022 | Chieh et al. | |
| 2022/0308165 | A1 | 9/2022 | Teague et al. | |
| 2024/0421489 | A1 | 12/2024 | Chivukula | |

FOREIGN PATENT DOCUMENTS

| | | | |
|---|---|---|---|
| CN | 114039216 | A | 2/2022 |
| EP | 0720252 | A1 | 7/1996 |
| WO | 2010106396 | A1 | 9/2010 |

OTHER PUBLICATIONS

Extended European Search Report Mailed on Apr. 23, 2024 for EP Application No. 23210573, 12 page(s).

Extended European Search Report Mailed on Nov. 13, 2024 for EP Application No. 24177730, 11 page(s).

H. Schippers et al., "Development of Dual-Frequency Airborne Satcom Antenna with Optical Beamforming," Aerospace Conference, IEEE, 1-16, (Mar. 7, 2009).

Ivan Russo et al., "Dual-Band Antenna Array With Superdirective Elements for Short-Distance Ballistic Tracking," IEEE Transactions on Antennas and Propagation, 67(1):232-241, (2019).

* cited by examiner

SCALABLE ELECTRONICALLY STEERABLE ANTENNA FOR L-BAND COMMUNICATION

CROSS-REFERENCE TO RELATED APPLICATION(S)

This application claims the benefit of priority to Indian Provisional Patent Application No. 202211071186, filed on Dec. 9, 2022, the entirety of which is incorporated by reference herein.

TECHNICAL FIELD

Various embodiments of the present disclosure relate generally to a scalable electronically steerable antenna for L-band communication, and, more particularly, to a modular, scalable, low profile, and electronically steerable antenna with a high gain at low elevation for L-band satellite communication.

BACKGROUND

Some L-band antennas may provide broad coverage for lower data rates and for higher elevation angles. At lower elevation angles, such as those near the horizon, some L-band antennas may be less effective.

The present disclosure is directed to overcoming one or more of these above-referenced challenges.

SUMMARY OF THE DISCLOSURE

In some aspects, the techniques described herein relate to an electronically steerable antenna for L-band satellite communication, the antenna including: a patch antenna including: four antenna elements spaced apart in a patch plane to form a two-by-two grid with a spacing between each antenna element of less than a half wavelength, a ground plane, and one or more controllers configured to apply difference beam steering to the four antenna elements; and a crossed metallic fence electrically connected to the ground plane and extending through the patch plane between the four antenna elements to separate the four antenna elements into respective quadrants in the two-by-two grid.

In some aspects, the techniques described herein relate to an antenna, wherein the four antenna elements include a top patch plane and a bottom patch plane separated by an air gap.

In some aspects, the techniques described herein relate to an antenna, wherein the crossed metallic fence extends from the ground plane through the bottom patch plane and the top patch plane, and extends above the top patch plane.

In some aspects, the techniques described herein relate to an antenna, wherein a top of the crossed metallic fence is curved.

In some aspects, the techniques described herein relate to an antenna, wherein the crossed metallic fence is configured to tilt a beam of each antenna element of the four antenna elements outwards from a center of the crossed metallic fence.

In some aspects, the techniques described herein relate to an antenna, wherein the crossed metallic fence is configured to dissipate heat from the four antenna elements.

In some aspects, the techniques described herein relate to an antenna, wherein the four antenna elements are arranged in a sequential ninety degree rotated configuration.

In some aspects, the techniques described herein relate to an antenna, wherein the one or more controllers include a tracker configured to provide self-acquisition and self-tracking of a satellite.

In some aspects, the techniques described herein relate to an antenna, further including: a control board, wherein the one or more controllers are on the control board.

In some aspects, the techniques described herein relate to an antenna, wherein the control board further includes: a transmitter configured to receive data to be transmitted and process the data to be transmitted for transmission by the four antenna elements, and a receiver configured to receive a signal from the four antenna elements and process the signal as received data, wherein the one or more controllers are configured to control the transmitter and the receiver to apply difference beam steering to the four antenna elements.

In some aspects, the techniques described herein relate to an electronically steerable antenna for L-band satellite communication, the antenna including: a patch antenna including: a top patch array including four top patch elements spaced apart in a top patch plane to form a top patch two-by-two grid, a bottom patch array including four bottom patch elements spaced apart in a bottom patch plane to form a bottom patch two-by-two grid corresponding to the top patch two-by-two grid, and a feed coupler array including four feed elements arranged in a ground plane to form a ground plane two-by-two grid corresponding to the bottom patch two-by-two grid, wherein the top patch array, the bottom patch array, and the feed coupler array together form a two-by-two antenna array; and a crossed metallic fence extending from the feed coupler array, through the bottom patch array between the four bottom patch elements, and through the top patch array between the top patch elements to extend above the top patch elements.

In some aspects, the techniques described herein relate to an antenna, wherein each top patch element is printed on a ¼ size printed circuit board, and wherein each bottom patch element is printed on a ¼ size printed circuit board.

In some aspects, the techniques described herein relate to an antenna, wherein the top patch array includes nine top patch elements spaced apart in the top patch plane to form a top patch three-by-three grid, wherein the bottom patch array includes nine bottom patch elements spaced apart in the bottom patch plane to form a bottom patch three-by-three grid corresponding to the top patch three-by-three grid, wherein the feed coupler array includes nine feed elements arranged in the ground plane to form a ground plane three-by-three grid corresponding to the bottom patch three-by-three grid, and wherein the top patch array, the bottom patch array, and the feed coupler array together form a three-by-three antenna array.

In some aspects, the techniques described herein relate to an antenna, further including: one or more controllers configured to operate the three-by-three antenna array as each of the three-by-three antenna array and the two-by-two antenna array.

In some aspects, the techniques described herein relate to an antenna, wherein the top patch array includes sixteen top patch elements spaced apart in the top patch plane to form a top patch four-by-four grid, wherein the bottom patch array includes sixteen bottom patch elements spaced apart in the bottom patch plane to form a bottom patch four-by-four grid corresponding to the top patch four-by-four grid, wherein the feed coupler array includes sixteen feed elements arranged in the ground plane to form a ground plane four-by-four grid corresponding to the bottom patch four-by-four grid, and wherein the top patch array, the bottom patch array, and the feed coupler array together form a four-by-four antenna array.

In some aspects, the techniques described herein relate to an antenna, further including: one or more controllers configured to operate the four-by-four antenna array as each of the four-by-four antenna array, the three-by-three antenna array, and the two-by-two antenna array.

In some aspects, the techniques described herein relate to an electronically steerable antenna for L-band satellite communication, the antenna including: four antenna elements spaced apart in a patch plane with a spacing between each antenna element of less than a half wavelength; a crossed metallic fence extending through the patch plane between the four antenna elements to separate the four antenna elements; and one or more controllers configured to apply difference beam steering to the four antenna elements.

In some aspects, the techniques described herein relate to an antenna, further including: an extended heatsink chassis surrounding the four antenna elements in the patch plane, wherein the crossed metallic fence and the extended heatsink chassis dissipate heat from the four antenna elements.

In some aspects, the techniques described herein relate to an antenna, wherein the one or more controllers are configured to operate the antenna as each of a class 15, class 4, and class 16 antenna.

In some aspects, the techniques described herein relate to an antenna, wherein the antenna has greater than 4 dBi at a 20 degree elevation angle and greater than 1 dBi at 5 degree elevation angle.

Additional objects and advantages of the disclosed embodiments will be set forth in part in the description that follows, and in part will be apparent from the description, or may be learned by practice of the disclosed embodiments. The objects and advantages of the disclosed embodiments will be realized and attained by means of the elements and combinations particularly pointed out in the appended claims. It is to be understood that both the foregoing general description and the following detailed description are exemplary and explanatory only and are not restrictive of the disclosed embodiments, as claimed.

BRIEF DESCRIPTION OF THE DRAWINGS

The accompanying drawings, which are incorporated in and constitute a part of this specification, illustrate various exemplary embodiments and together with the description, serve to explain the principles of the disclosed embodiments.

DETAILED DESCRIPTION OF EMBODIMENTS

Figure 1:
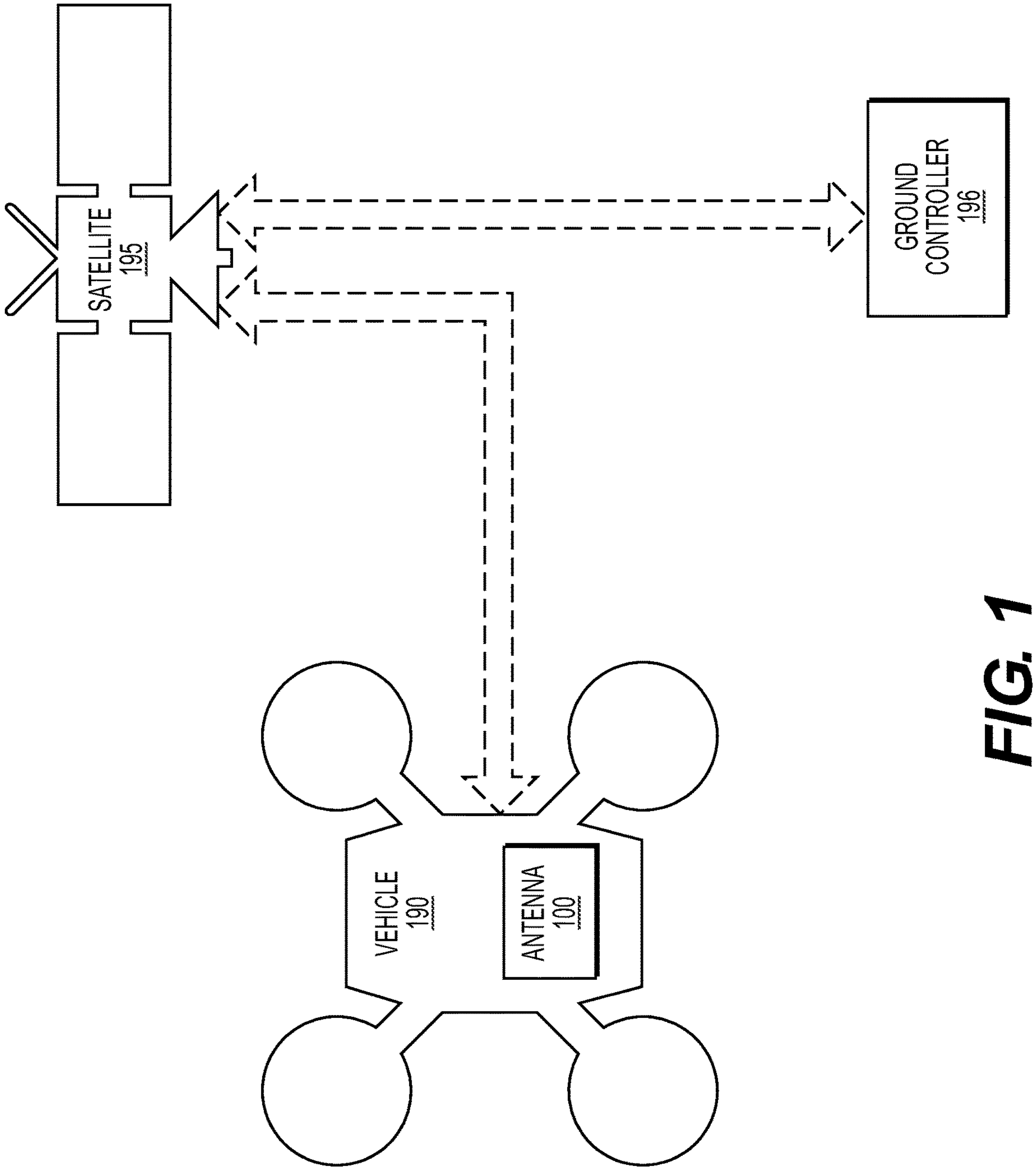
FIG. 1 depicts an exemplary system infrastructure for communication between a vehicle and a ground controller, according to one or more embodiments.

Various embodiments of the present disclosure relate generally to enabling voice control of an interactive audio-visual environment, and monitoring user behavior to assess engagement.

The terminology used below may be interpreted in its broadest reasonable manner, even though it is being used in conjunction with a detailed description of certain specific examples of the present disclosure. Indeed, certain terms may even be emphasized below; however, any terminology intended to be interpreted in any restricted manner will be overtly and specifically defined as such in this Detailed Description section.

Some L-band antennas, such as those used in small unmanned aerial vehicles for satellite communication, may provide only +/−70 degree elevation angle coverage for class 15 (200 kbps per channel) operation, may have low gain of only 2 dBi at 20 degree elevation leading to reduced effective isotropic radiated power (EIRP) operation at these low elevations, and may be limited to only class 15 operation. Some L-band antennas may provide higher speeds of 350 kbps uplink and 700 kbps downlink, but may not be scalable for different class operation to provide variable speeds per customer demand.

One or more embodiments may provide an optimized antenna for an unmanned aircraft system to provide improved spatial coverage including +/−90 degree coverage in elevation angle, optimum throughput with over 100% coverage volume, and 50% reduced power compared to existing class 15 antennas. One or more embodiments may provide an antenna extendable to class 4 and class 16 operation, and modular and scalable to class 6 & 7 and higher data rates of over 1 Mbps. One or more embodiments may provide an antenna with class and network agnostic functionality and dual beam on receive technology for self-steering and make before break operation. One or more embodiments may provide a low profile antenna with a height from approximately 1.5 inches to 2 inches that provides high gain at low elevation, such as greater than 4 dBi at a 20 degree elevation angle and greater than 1 dBi at 5 degree elevation angle, for example. The increased coverage at low elevation may provide overall greater reliability in data transmission, for example, and may provide better coverage for aircraft in specific orientations, such as during a banking maneuver, for example.

One or more embodiments may provide a scalable electronically steered antenna. One or more embodiments may provide a scalable 2×2 small electronically steered antenna for class 15, class 16, and class 4 operation. The 2×2 small electronically steered antenna may be scalable to small 3×3 and 4×4 electronically steered antennas for intermediate gain and high gain, respectively. The 3×3 and 4×4 antennas may switch to low gain operation mode (i.e. 2×2 mode) when lower elevation operation is needed on a dynamic (during a mission) or mission-based (before a mission) operation without changing hardware of the antenna.

One or more embodiments may provide difference beam steering to steer an antenna beam to a low elevation angle while maintaining a gain variation of less than 4 dB in the entire upper hemisphere. One or more embodiments may provide 4 beam steering positions, 7 beam steering positions, or 15 beam steering positions, for example. One or more embodiments may provide a low cost, two printed circuit board antenna architecture with a lightweight metallic printed chassis, and an additional printed circuit board for radio frequency and control. One or more embodiments may provide up to an approximately 20 mm extended metallic fencing between the antenna elements to improve low elevation gain and reduce coupling. One or more embodiments may provide closely spaced flat or tilted antenna elements to reduce the width of the antenna and to reduce the gain variation in the coverage region (+/−90 degrees).

One or more embodiments may provide a low profile, lightweight antenna with improved low elevation gain for L-Band satellite communication applications. One or more embodiments may provide an electronically steered antenna that covers an entire upper hemisphere, within +/−approximately 5 degree elevation angle, with a gain greater than 2 dBiC with only 7 beams. One or more embodiments may provide an antenna which achieves a gain variation of less than 3.5 dB and an axial ratio of less than 6 dB in a lightweight and small form factor of approximately 5.5 inches×5.5 inches×2.1 inches. One or more embodiments may provide an improved low elevation gain (greater than 2 dBiC at a 5 degree elevation angle) by difference beam steering and an extended metallic fence. One or more embodiments may provide full upper hemisphere coverage with only 7 beams by difference beam steering in phi=0 (180) degree and phi=90 (270) degrees planes, and sum beam steering in phi=45, 135, 225, and 315 degree planes. One or more embodiments may provide a difference beam with two peaks.

One or more embodiments may provide a gain variation of 3.5 dB over entire upper hemisphere by sub half wavelength (less than 0.5λ/2, such as 0.4λ/2, for example) element spacing, difference beam steering, and extended fencing in phi=0 degree and phi=90 degree planes. One or more embodiments may provide a low elevation gain improvement using extended metallic fencing at a center of the antenna that causes the individual element pattern to tilt outwards. One or more embodiments may provide a small form factor of the array by sub half wavelength element spacing (less than 0.5λ/2), a metallic enclosure, and extended fencing at the center. One or more embodiments may result in improved mutual coupling and obtaining a better input match for the array. One or more embodiments may provide an array that has tightly coupled patches that perform in multiple beam positions. One or more embodiments may provide a lightweight design of less than approximately 700 grams (1.5 lbs) by using three thin (less than 1.5 mm) printed circuit boards (PCB) separated by thick air gaps. One or more embodiments may include top and bottom patches that are printed on ¼th size PCB (in an XY plane) and feed traces that are printed on a full size PCB.

One or more embodiments may provide a 2×2 grid class 15, class 4, or class 16 antenna with a weight of less than approximately 700 grams (1.5 lbs), and with a size of approximately 5.5 inches×5.5 inches×2.1 inches. One or more embodiments may provide a class 7 antenna with a weight of approximately 1.5 kilograms. One or more embodiments may provide a class 6 antenna with a weight of approximately 3.0 kilograms. One or more embodiments may provide a 3×3 grid antenna with a size of approximately 7.5 inches×7.5 inches×2.1 inches. One or more embodiments may provide a 4×4 grid antenna with a size of approximately 10 inches×10 inches×2 inches. One or more embodiments may provide a 4×4 grid antenna that may be used as a 3×3 grid antenna or a 2×2 grid antenna, and may therefore may provide a single antenna that may be used for class 6, class 7, class 15, class 4, or class 16. One or more embodiments may provide a 3×3 grid antenna that may be used as a 2×2 grid antenna.

One or more embodiments may provide a reduced size heatsink by using an extended surface for thermal dissipation using a metallic enclosure and central fencing as heat dissipation regions by natural air cooling from the sides. One or more embodiments may include a curved top fence or a flat top fence. One or more embodiments may include metallic fencing that extends downwards to a ground plane.

One or more embodiments may include antenna elements arranged with feed elements in regular symmetry, 180° symmetry, or sequential 90° rotated configurations. One or more embodiments may include antenna elements connected to a hybrid coupler in a feed layer and further connected to a coaxial connector (one per element) to connect with the RF Printed Circuit Board Assembled (PBA), which may reduce the PCB fabrication cost for multilayer boards and which may reduce overall weight. One or more embodiments may include an on-antenna digital beam forming system implemented on a controller for a low-gain antenna without intervention from another controller, which may provide self-acquisition and self-tracking of a satellite beacon and avoid the need for external position information, such as from a global positioning system or inertial measurement unit, for example.

FIG. 1 depicts an exemplary system infrastructure for communication between a vehicle and a ground controller, according to one or more embodiments. As shown in FIG. 1, a vehicle 190 may include antenna 100 to communicate via satellite 195 with a ground controller 196. Vehicle 190 may be an aircraft such as an unmanned aerial vehicle, for example, and may include antenna 100 to communicate video data via satellite 195 to ground controller 196 and receive instructions from ground controller 196. However, the disclosure is not limited thereto.

Figure 2:
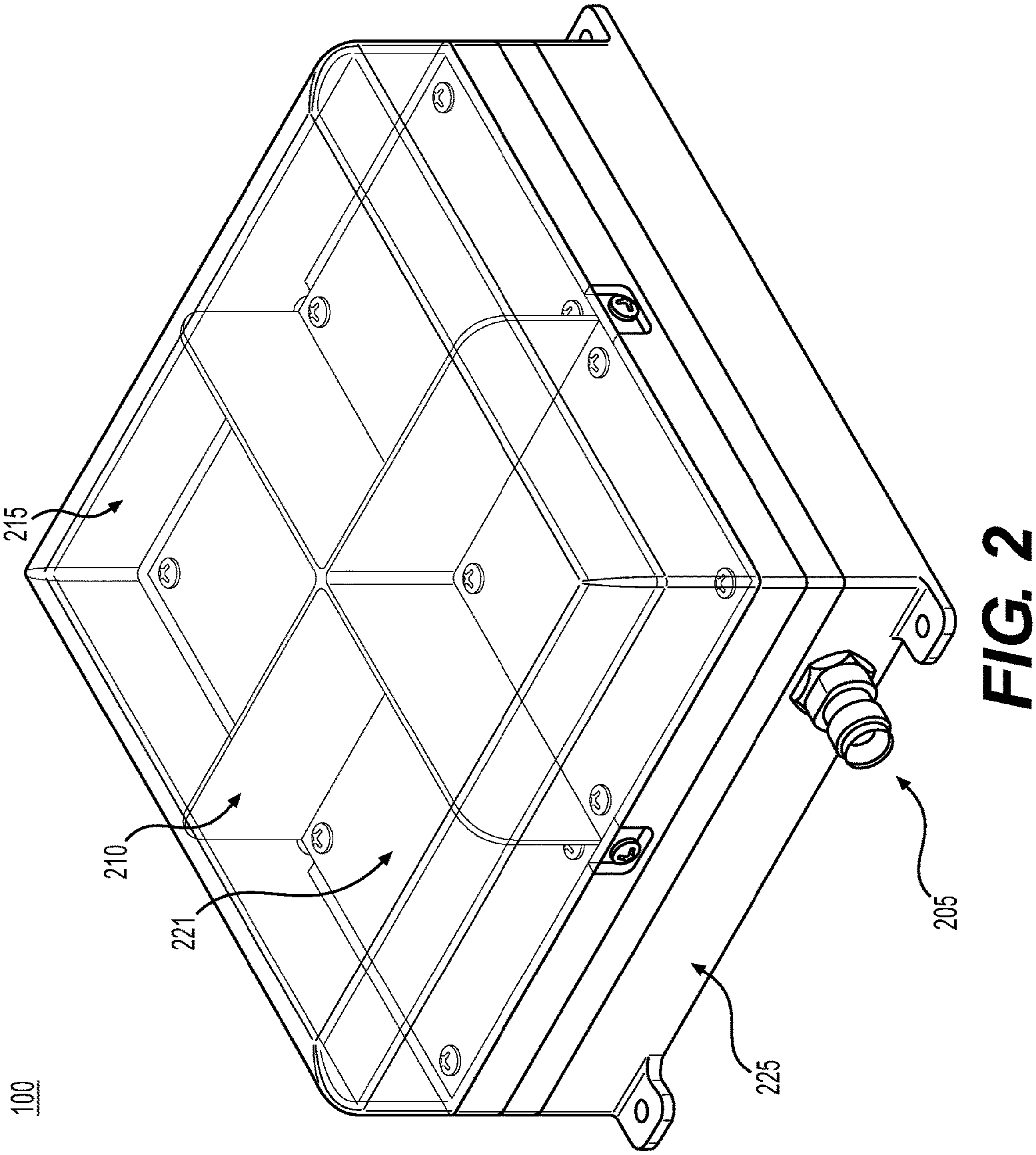
FIG. 2 depicts an exemplary outer view of an electronically steerable antenna, according to one or more embodiments.

FIG. 2 depicts an exemplary system infrastructure for an electronically steerable antenna, according to one or more embodiments. As shown in FIG. 2, antenna 100 may include TNC connector 205, fence 210, radome 215, top patch 221, and heatsink chassis 225. Antenna 100 may be 140 mm×140 mm, with a low profile height of 56 mm, for example. Heatsink chassis 225 may be square, as shown, or may be chamfered or rounded.

Fence 210 may extend above heatsink chassis 225. For example, an antenna with no fence may have a gain of 0.72 at an 85 degree elevation angle. Fence 210 may extend 5 mm above top patch 221 and/or heatsink chassis 225. For a 5 mm height of fence 210, antenna 100 may have a gain of 1.89 at an 85 degree elevation angle. Fence 210 may extend 22.5 mm above top patch 221 and/or heatsink chassis 225. For a 22.5 mm height of fence 210, antenna 100 may have a gain of 3.35 at an 85 degree elevation angle. Fence 210 may extend between individual array elements of top patch 221. For example, as shown in FIG. 2, four elements of top patch 221 may be spaced apart in a patch plane to form a two-by-two grid with a spacing between each element of less than a half wavelength, such as 0.3λ to 0.5λ, for example. Fence 210 may be a crossed metallic fence electrically connected to a ground plane and extending through the top patch 221 plane between the four elements of top patch 221 to separate the four elements of top patch 221 into respective quadrants in the two-by-two grid. Fence 210 may be electrically connected to a ground plane and to the heatsink chassis 225.

Figure 3:
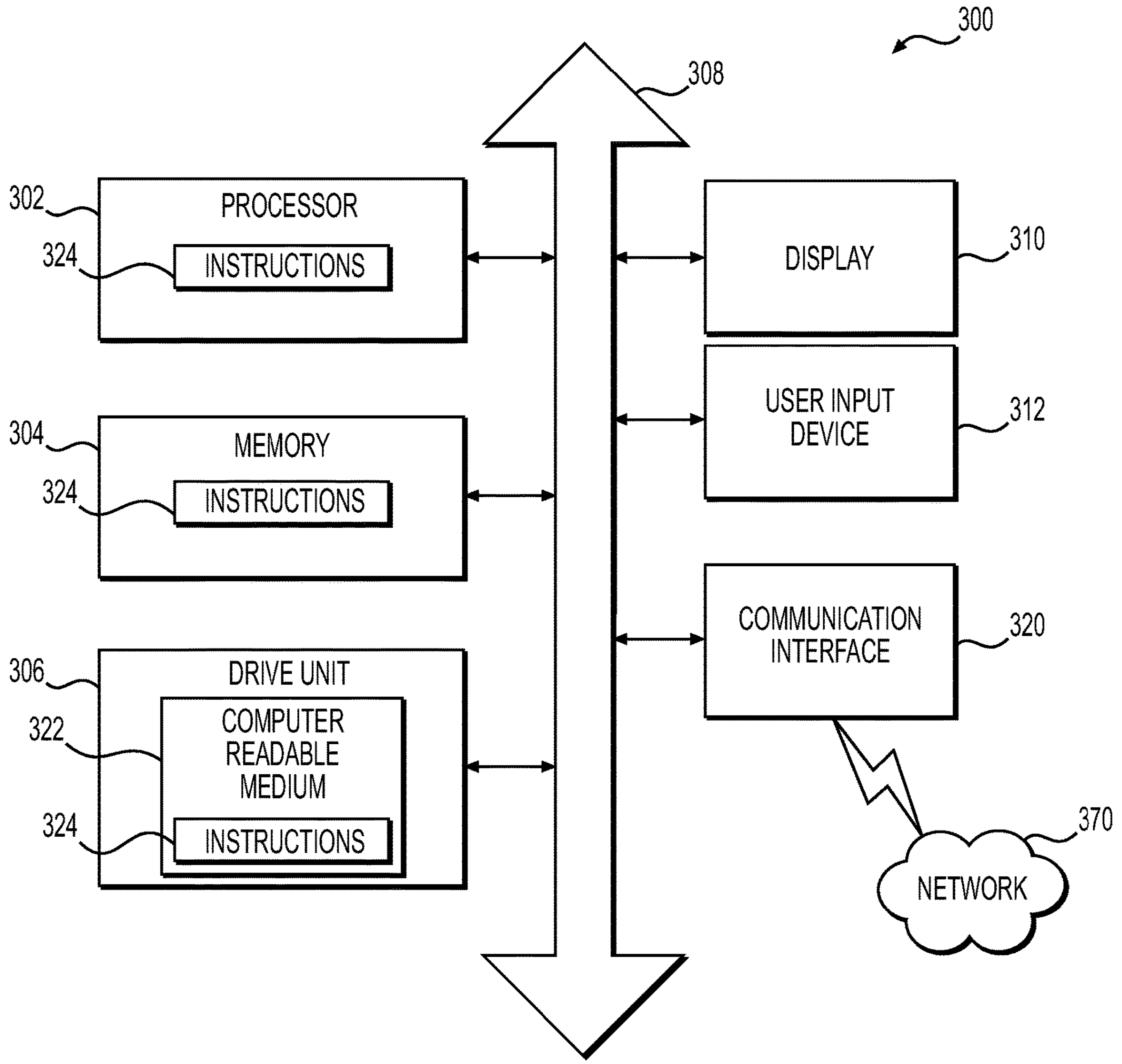
FIG. 3 depicts an exemplary implementation of a controller that may execute techniques presented herein, according to one or more embodiments.

FIG. 3 depicts an implementation of a controller 300 that may execute techniques presented herein, according to one or more embodiments. The controller 300 may include a set of instructions that can be executed to cause the controller 300 to perform any one or more of the methods or computer based functions disclosed herein. The controller 300 may operate as a standalone device or may be connected, e.g., using a network, to other computer systems or peripheral devices.

In a networked deployment, the controller 300 may operate in the capacity of a server or as a client in a server-client user network environment, or as a peer computer system in a peer-to-peer (or distributed) network environment. The controller 300 can also be implemented as or incorporated into various devices, such as a personal computer (PC), a tablet PC, a set-top box (STB), a personal digital assistant (PDA), a mobile device, a palmtop computer, a laptop computer, a desktop computer, a communications device, a wireless telephone, a land-line telephone, a control system, a camera, a scanner, a facsimile machine, a printer, a pager, a personal trusted device, a web appliance, a network router, switch or bridge, or any other machine capable of executing a set of instructions (sequential or otherwise) that specify actions to be taken by that machine. In a particular implementation, the controller 300 can be implemented using electronic devices that provide voice, video, or data communication. Further, while the controller 300 is illustrated as a single system, the term "system" shall also be taken to include any collection of systems or sub-systems that individually or jointly execute a set, or multiple sets, of instructions to perform one or more computer functions.

As illustrated in FIG. 3, the controller 300 may include a processor 302, e.g., a central processing unit (CPU), a graphics processing unit (GPU), or both. The processor 302 may be a component in a variety of systems. For example, the processor 302 may be part of a standard computer. The processor 302 may be one or more general processors, digital signal processors, application specific integrated circuits, field programmable gate arrays, servers, networks, digital circuits, analog circuits, combinations thereof, or other now known or later developed devices for analyzing and processing data. The processor 302 may implement a software program, such as code generated manually (i.e., programmed).

The controller 300 may include a memory 304 that can communicate via a bus 308. The memory 304 may be a main memory, a static memory, or a dynamic memory. The memory 304 may include, but is not limited to computer readable storage media such as various types of volatile and non-volatile storage media, including but not limited to random access memory, read-only memory, programmable read-only memory, electrically programmable read-only memory, electrically erasable read-only memory, flash memory, magnetic tape or disk, optical media and the like. In one implementation, the memory 304 includes a cache or random-access memory for the processor 302. In alternative implementations, the memory 304 is separate from the processor 302, such as a cache memory of a processor, the system memory, or other memory. The memory 304 may be an external storage device or database for storing data. Examples include a hard drive, compact disc ("CD"), digital video disc ("DVD"), memory card, memory stick, floppy disc, universal serial bus ("USB") memory device, or any other device operative to store data. The memory 304 is operable to store instructions executable by the processor 302. The functions, acts or tasks illustrated in the figures or described herein may be performed by the processor 302 executing the instructions stored in the memory 304. The functions, acts or tasks are independent of the particular type of instructions set, storage media, processor or processing strategy and may be performed by software, hardware, integrated circuits, firm-ware, micro-code and the like, operating alone or in combination. Likewise, processing strategies may include multiprocessing, multitasking, parallel processing and the like.

As shown, the controller 300 may further include a display 310, such as a liquid crystal display (LCD), an organic light emitting diode (OLED), a flat panel display, a solid-state display, a cathode ray tube (CRT), a projector, a printer or other now known or later developed display device for outputting determined information. The display 310 may act as an interface for the user to see the functioning of the processor 302, or specifically as an interface with the software stored in the memory 304 or in the drive unit 306.

Additionally or alternatively, the controller 300 may include an input device 312 configured to allow a user to interact with any of the components of controller 300. The input device 312 may be a number pad, a keyboard, or a cursor control device, such as a mouse, or a joystick, touch screen display, remote control, or any other device operative to interact with the controller 300.

The controller 300 may also or alternatively include drive unit 306 implemented as a disk or optical drive. The drive unit 306 may include a computer-readable medium 322 in which one or more sets of instructions 324, e.g. software, can be embedded. Further, the instructions 324 may embody one or more of the methods or logic as described herein. The instructions 324 may reside completely or partially within the memory 304 and/or within the processor 302 during execution by the controller 300. The memory 304 and the processor 302 also may include computer-readable media as discussed above.

In some systems, a computer-readable medium 322 includes instructions 324 or receives and executes instructions 324 responsive to a propagated signal so that a device connected to a network 370 can communicate voice, video, audio, images, or any other data over the network 370. Further, the instructions 324 may be transmitted or received over the network 370 via a communication port or interface 320, and/or using a bus 308. The communication port or interface 320 may be a part of the processor 302 or may be a separate component. The communication port or interface 320 may be created in software or may be a physical connection in hardware. The communication port or interface 320 may be configured to connect with a network 370, external media, the display 310, or any other components in controller 300, or combinations thereof. The connection with the network 370 may be a physical connection, such as a wired Ethernet connection or may be established wirelessly as discussed below. Likewise, the additional connections with other components of the controller 300 may be physical connections or may be established wirelessly. The network 370 may alternatively be directly connected to a bus 308.

While the computer-readable medium 322 is shown to be a single medium, the term "computer-readable medium" may include a single medium or multiple media, such as a centralized or distributed database, and/or associated caches and servers that store one or more sets of instructions. The term "computer-readable medium" may also include any medium that is capable of storing, encoding, or carrying a set of instructions for execution by a processor or that cause a computer system to perform any one or more of the methods or operations disclosed herein. The computer-readable medium 322 may be non-transitory, and may be tangible.

The computer-readable medium 322 can include a solid-state memory such as a memory card or other package that houses one or more non-volatile read-only memories. The computer-readable medium 322 can be a random-access memory or other volatile re-writable memory. Additionally or alternatively, the computer-readable medium 322 can include a magneto-optical or optical medium, such as a disk or tapes or other storage device to capture carrier wave signals such as a signal communicated over a transmission medium. A digital file attachment to an e-mail or other self-contained information archive or set of archives may be considered a distribution medium that is a tangible storage medium. Accordingly, the disclosure is considered to include any one or more of a computer-readable medium or a distribution medium and other equivalents and successor media, in which data or instructions may be stored.

In an alternative implementation, dedicated hardware implementations, such as application specific integrated circuits, programmable logic arrays and other hardware devices, can be constructed to implement one or more of the methods described herein. Applications that may include the apparatus and systems of various implementations can broadly include a variety of electronic and computer systems. One or more implementations described herein may implement functions using two or more specific interconnected hardware modules or devices with related control and data signals that can be communicated between and through the modules, or as portions of an application-specific integrated circuit. Accordingly, the present system encompasses software, firmware, and hardware implementations.

The controller 300 may be connected to a network 370. The network 370 may define one or more networks including wired or wireless networks. The wireless network may be a cellular telephone network, an 802.11, 802.16, 802.20, or WiMAX network. Further, such networks may include a public network, such as the Internet, a private network, such as an intranet, or combinations thereof, and may utilize a variety of networking protocols now available or later developed including, but not limited to TCP/IP based networking protocols. The network 370 may include wide area networks (WAN), such as the Internet, local area networks (LAN), campus area networks, metropolitan area networks, a direct connection such as through a Universal Serial Bus (USB) port, or any other networks that may allow for data communication. The network 370 may be configured to couple one computing device to another computing device to enable communication of data between the devices. The network 370 may generally be enabled to employ any form of machine-readable media for communicating information from one device to another. The network 370 may include communication methods by which information may travel between computing devices. The network 370 may be divided into sub-networks. The sub-networks may allow access to all of the other components connected thereto or the sub-networks may restrict access between the components. The network 370 may be regarded as a public or private network connection and may include, for example, a virtual private network or an encryption or other security mechanism employed over the public Internet, or the like.

In accordance with various implementations of the present disclosure, the methods described herein may be implemented by software programs executable by a computer system. Further, in an exemplary, non-limited implementation, implementations can include distributed processing, component/object distributed processing, and parallel processing. Alternatively, virtual computer system processing can be constructed to implement one or more of the methods or functionality as described herein.

Although the present specification describes components and functions that may be implemented in particular implementations with reference to particular standards and protocols, the disclosure is not limited to such standards and protocols. For example, standards for Internet and other packet switched network transmission (e.g., TCP/IP, UDP/IP, HTML, HTTP) represent examples of the state of the art. Such standards are periodically superseded by faster or more efficient equivalents having essentially the same functions. Accordingly, replacement standards and protocols having the same or similar functions as those disclosed herein are considered equivalents thereof.

It will be understood that the steps of methods discussed are performed in one embodiment by an appropriate processor (or processors) of a processing (i.e., computer) system executing instructions (computer-readable code) stored in storage. It will also be understood that the disclosure is not limited to any particular implementation or programming technique and that the disclosure may be implemented using any appropriate techniques for implementing the functionality described herein. The disclosure is not limited to any particular programming language or operating system.

Figure 4:
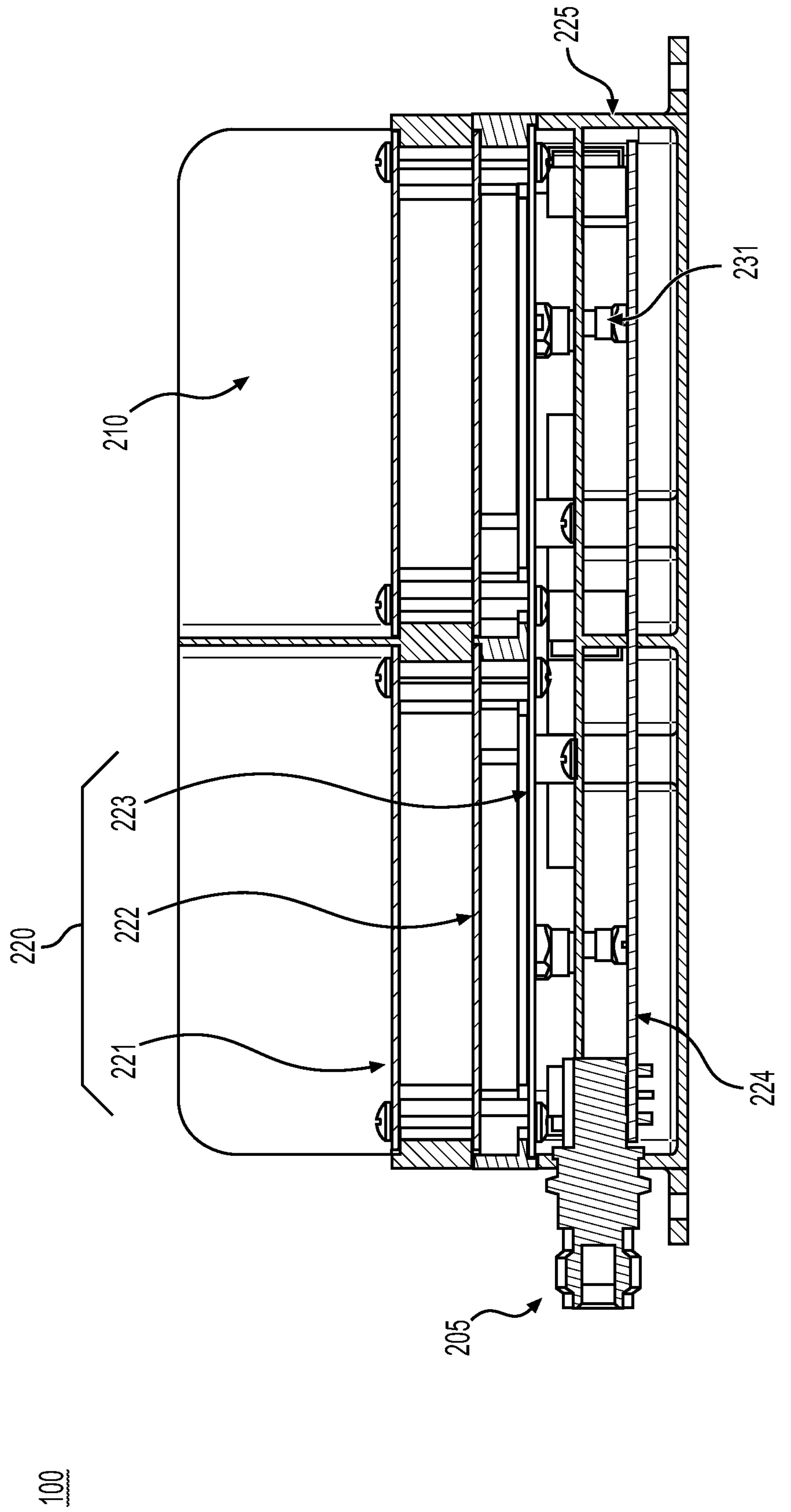
FIG. 4 depicts an exemplary inner view of an electronically steerable antenna, according to one or more embodiments.

FIG. 4 depicts an exemplary inner view of an electronically steerable antenna, according to one or more embodiments. As shown in FIG. 4, antenna 100 may include TNC connector 205, fence 210, top patch 221, bottom patch 222, feed coupler 223, control board 224, heatsink chassis 225, and connector 231. Top patch 221, bottom patch 222, and feed coupler 223 may together form antenna array 220. Top patch 221, bottom patch 222, and feed coupler 223 may be separated by air gaps. Top patch 221, bottom patch 222, and feed coupler 223 may be separated by dielectric materials. Connector 231 may connect signals from control board 224 to feed coupler 223.

Fence 210 may extend from above the top patch 221 to feed coupler 223. Fence 210 may be a solid metallic material. Fence 210 may or may not have openings or spacing. Fence 210 may present a reflective structure in a corner of each of the four patches in top patch 221 and bottom patch 222, and may create an effective "tilt" in the radiation pattern of each array element of antenna array 220 in a direction outward of antenna 100, where there is no reflecting structure in antenna 100. This tilt may improve the gain of antenna 100 at low elevation angles close to the horizon.

Figure 5:
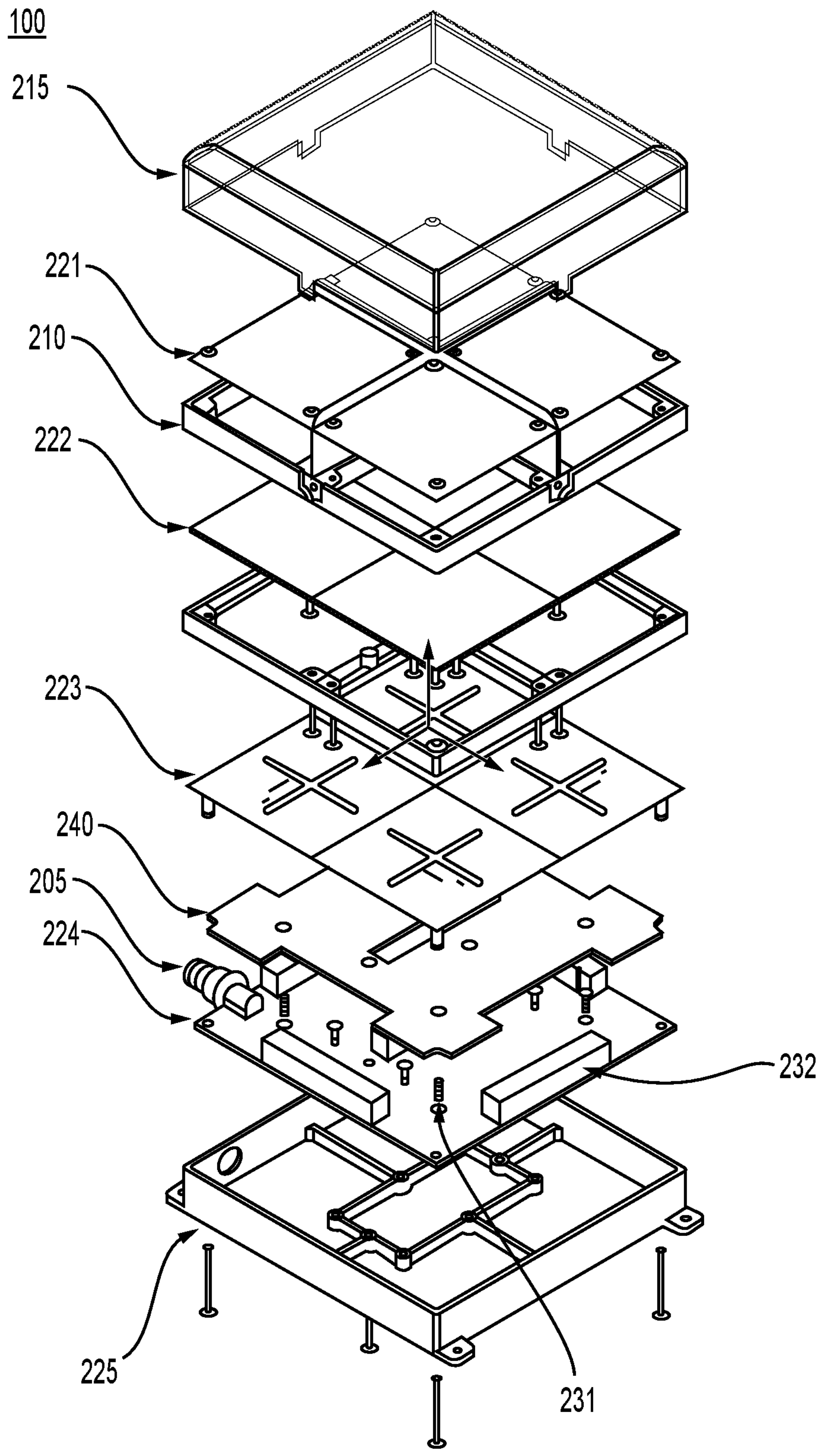
FIG. 5 depicts an exemplary exploded view of an electronically steerable antenna, according to one or more embodiments.

FIG. 5 depicts an exemplary exploded view of an electronically steerable antenna, according to one or more embodiments. As shown in FIG. 5, antenna 100 may include TNC connector 205, fence 210, radome 215, top patch 221, bottom patch 222, feed coupler 223, control board 224, heatsink chassis 225, connector 231, and array diplexer 232, and shield 240. TNC connector 205 may be a single connection to antenna 100, and may provide a power and signal communication link with a satellite data unit (SDU), for example.

Figure 6:
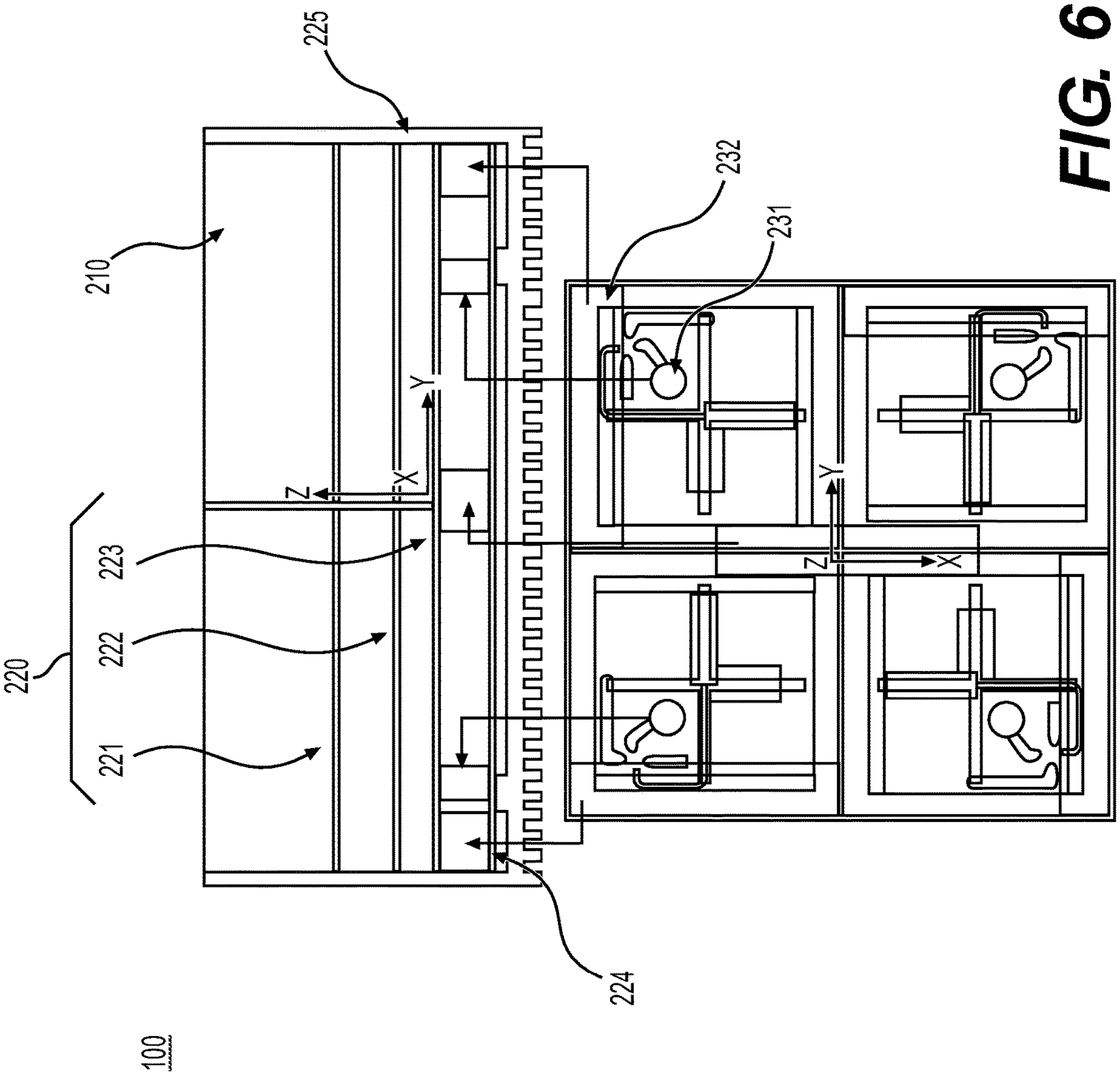
FIG. 6 depicts an exemplary connection view of an electronically steerable antenna, according to one or more embodiments.

FIG. 6 depicts an exemplary connection view of an electronically steerable antenna, according to one or more embodiments. As shown in FIG. 6, antenna 100 may include fence 210, top patch 221, bottom patch 222, feed coupler 223, control board 224, heatsink chassis 225, connector 231, and array diplexer 232. Top patch 221, bottom patch 222, and feed coupler 223 may together form antenna array 220.

FIG. 6 illustrates the antenna elements in sequential 90° rotated configurations. However, the disclosure is not limited thereto. The antenna elements may be arranged with feed elements in regular symmetry, 180° symmetry, or sequential 90° rotated configurations, for example.

Figure 7:
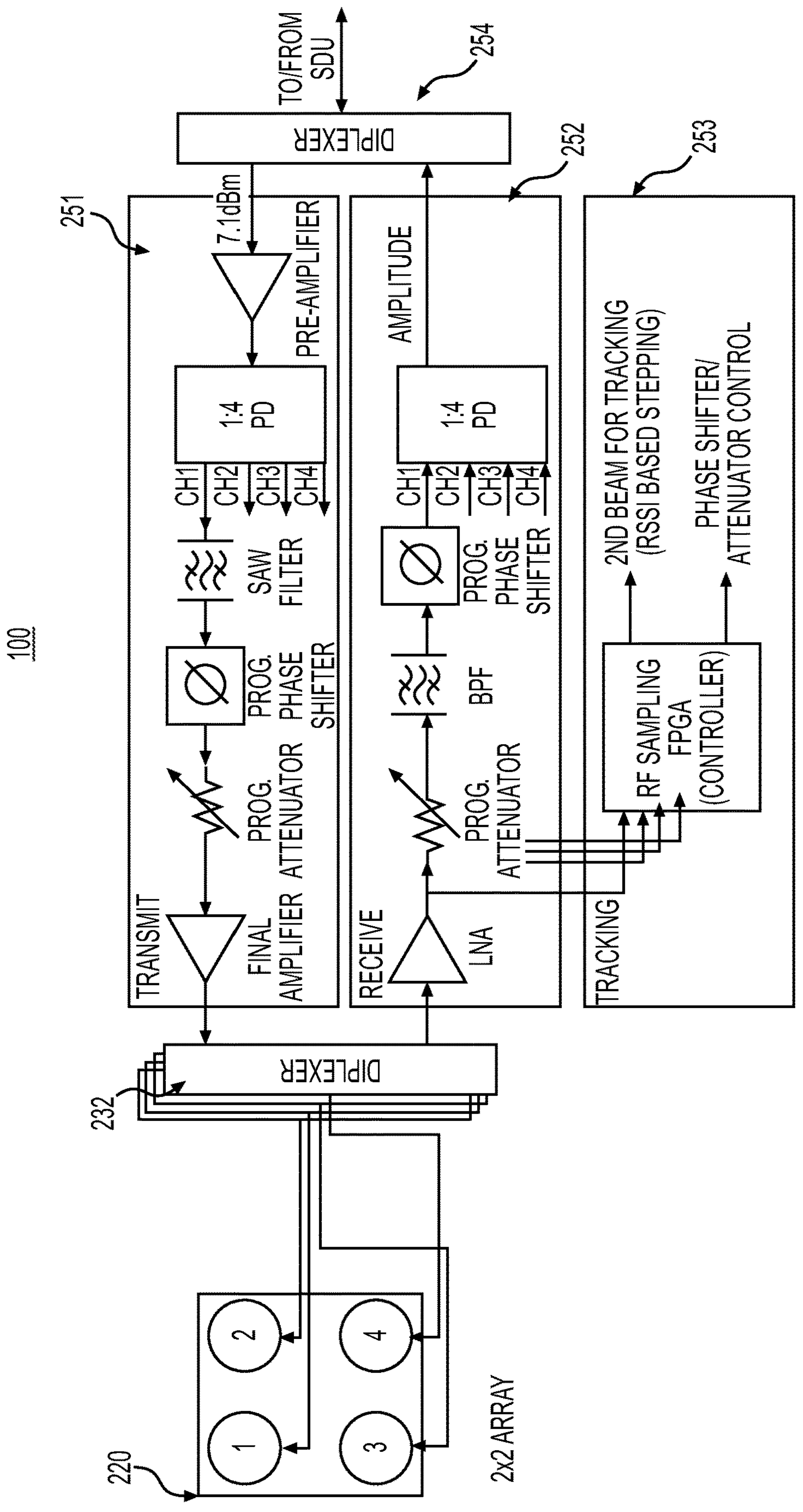
FIG. 7 depicts an exemplary electronic schematic of an electronically steerable antenna, according to one or more embodiments.

FIG. 7 depicts an exemplary electronic schematic of an electronically steerable antenna, according to one or more embodiments. As shown in FIG. 7, antenna 100 may include antenna array 220, array diplexer 232, transmitter 251, receiver 252, tracker 253, and signal diplexer 254.

Antenna array 220 may be a 2×2 array, for example, with each array element communicating with array diplexer 232. Signal diplexer 254 may send and receive data, such as to and from a satellite data unit (SDU), for example. Signal diplexer 254 may receive data to be transmitted and send received data. Signal diplexer 254 may receive data to be transmitted from vehicle 190, and send the data to be transmitted at a first frequency to transmitter 251. Signal diplexer 254 may receive the received data from receiver 252 at a second frequency different from the first frequency, and send the received data to the vehicle 190.

As shown in FIG. 7, transmitter 251 may receive a signal, such as the data to be transmitted, from signal diplexer 254, prepare the signal for transmission, and send the signal to array diplexer 232 to be transmitted by antenna array 220. Transmitter 251 may include circuitry as needed to prepare the signal for transmission, and may include components such as a pre-amplifier, a partial discharge channel multiplexer, a surface acoustic wave filter, a programmable phase shifter, a programmable attenuator, and a final amplifier, for example. However, the disclosure is not limited thereto.

As shown in FIG. 7, antenna array 220 may be a 2×2 array. Therefore, array diplexer 232 may include four array diplexers, for example, to send and receive signals from four elements of antenna array 220, respectively. However, the disclosure is not limited thereto, and antenna array 220 may be a 3×3 array or a 4×4 array, for example. Antenna array 220 may transmit signals from array diplexer 232 to ground controller 196 via satellite 195, for example, and may receive signals from ground controller 196 via satellite 195. Antenna array 220 may send the received signals from satellite 195 to array diplexer 232, and array diplexer 232 may send the signals from antenna array 220 to receiver 252 for processing.

Receiver 252 may receive a signal, from array diplexer 232, process the signal, and send the processed signal, as the received data, for example, to signal diplexer 254 to be sent to vehicle 190. Receiver 252 may include circuitry as needed to process the received signal, and may include components such as a low noise amplifier, a programmable attenuator, a band-pass filter, a programmable phase shifter, and a partial discharge channel multiplexer, for example. However, the disclosure is not limited thereto. Signal diplexer 254 may receive the received data from receiver 252 at a second frequency different from the first frequency, and send the received data to the vehicle 190.

Antenna 100 may include tracker 253, which may receive a partially processed signal from receiver 252, and control antenna 100 based on the partially processed signal. Tracker 253 may include a radio frequency sampling controller, such as a field programmable gate array, and control a second tracking beam using a received signal strength indicator (RSSI) based stepping method, for example. Tracker 253 may control the programmable phase shifters and attenuators of one or more of transmitter 251 and receiver 252, for example.

Tracker 253 may be provided on control board 224. Tracker 253 may apply difference beam steering to antenna array 220. Tracker 253 may be an implementation of controller 300, for example.

Figure 8:
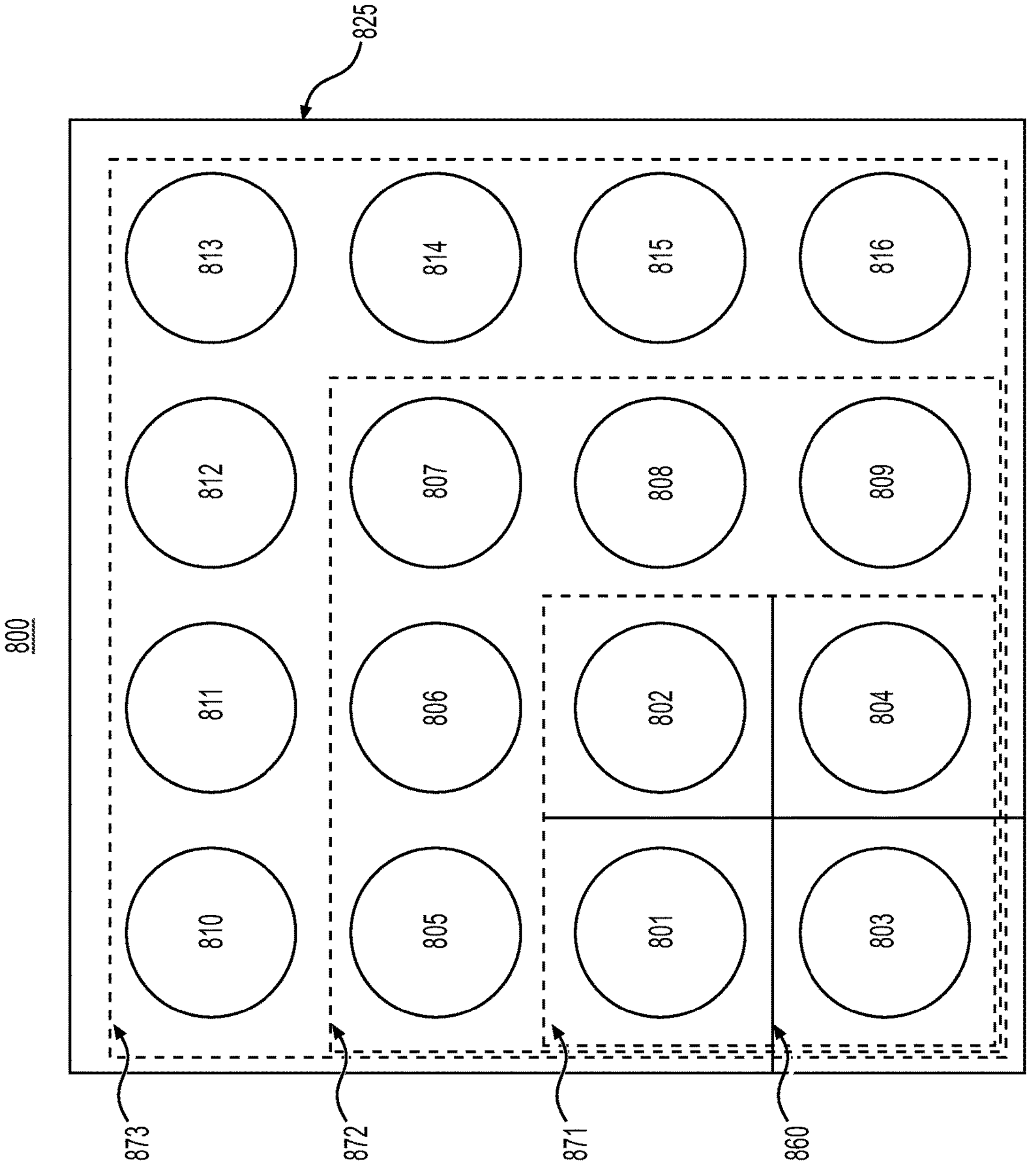
FIG. 8 depicts an exemplary architecture of a scalable electronically steerable antenna, according to one or more embodiments.

FIG. 8 depicts an exemplary architecture of a scalable electronically steerable antenna, according to one or more embodiments. As shown in FIG. 8, antenna 800 may be an implementation of antenna 100, for example, including heatsink chassis 825 and fence 860, which may be implementations of heatsink chassis 225 and fence 210, respectively. 2×2 antenna array 871 may be an implementation of antenna array 220 as a 2×2 array, and include array elements 801-804, where each array element may be an implementation of top patch 221 and bottom patch 222 with a common element feed coupler 223. 3×3 antenna array 872 may be an implementation of antenna array 220 as a 3×3 array, and include array elements 801-809, where each array element may be an implementation of top patch 221 and bottom patch 222 with a common element feed coupler 223. 4×4 antenna array 873 may be an implementation of antenna array 220 as a 4×4 array, and include array elements 801-816, where each array element may be an implementation of top patch 221 and bottom patch 222 with a common element feed coupler 223. Although fence 860 and 2×2 antenna array 871 are shown in a quadrant of antenna 800, fence 860 and 2×2 antenna array 871 may be provided in any location on antenna 800, such as in a center, for example.

As shown, the same antenna 800 may be operable as 2×2 antenna array, 3×3 antenna array 872, or 4×4 antenna array 873, depending on a selection of array elements by a controller, such as tracker 253, for example. Accordingly, one or more embodiments may provide a scalable electronically steered antenna. One or more embodiments may provide a scalable 2×2 small electronically steered antenna for class 15, class 16, and class 4 operation. The 2×2 small electronically steered antenna may be scalable to small 3×3 and 4×4 electronically steered antennas for intermediate gain and high gain, respectively. The 3×3 and 4×4 antennas may switch to low gain operation mode (i.e. 2×2 mode) when lower elevation operation is needed on a dynamic (during a mission) or mission-based (before a mission) operation without changing hardware of the antenna.

One or more embodiments may provide an optimized antenna for an unmanned aircraft system to provide improved spatial coverage including +/−90 degree coverage in elevation angle, optimum throughput with over 100% coverage volume, and 50% reduced power compared to existing class 15 antennas. One or more embodiments may provide an antenna extendable to class 4 and class 16 operation, and modular and scalable to class 6 & 7 and higher data rates of over 1 Mbps. One or more embodiments may provide an antenna with class and network agnostic functionality and dual beam on receive technology for self-steering and make before break operation. One or more embodiments may provide a low profile antenna with a height from approximately 1.5 inches to 2 inches that provides high gain at low elevation, such as greater than 4 dBi at a 20 degree elevation angle and greater than 1 dBi at 5 degree elevation angle, for example. The increased coverage at low elevation may provide overall greater reliability in data transmission, for example, and may provide better coverage for aircraft in specific orientations, such as during a banking maneuver, for example.

One or more embodiments may provide difference beam steering to steer an antenna beam to a low elevation angle while maintaining a gain variation of less than 4 dB in the entire upper hemisphere. One or more embodiments may provide four beam steering positions, 7 beam steering positions, or 15 beam steering positions, for example. One or more embodiments may provide a low cost three printed circuit board antenna architecture with a lightweight metallic printed chassis, and an additional printed circuit board for radio frequency and control. One or more embodiments may provide up to approximately 20 mm extended metallic fencing between the antenna elements to improve low elevation gain and reduce coupling. One or more embodiments may provide closely spaced flat or tilted antenna elements to reduce the width of the antenna.

One or more embodiments may provide a low profile, lightweight antenna with improved low elevation gain for L-Band satellite communication applications. One or more embodiments may provide an electronically steered antenna that covers an entire upper hemisphere, within +/−approximately 5 degree elevation angle, with a gain greater than 2 dBiC with only 7 beams. One or more embodiments may provide an antenna which achieves a gain variation of less than 3.5 dB and an axial ratio of less than 6 dB in a lightweight and small form factor of approximately 5.5 inches×5.5 inches×2.1 inches. One or more embodiments may provide an improved low elevation gain (greater than 2 dBiC at a 5 degree elevation angle) by difference beam steering and an extended metallic fence. One or more embodiments may provide full upper hemisphere coverage with only 7 beams by difference beam steering in phi=0 (180) degree and phi=90 (270) degrees planes, and sum beam steering in phi=45, 135, 225, and 315 degree planes. One or more embodiments may provide a difference beam with two peaks.

One or more embodiments may provide a gain variation of 3.5 dB over entire upper hemisphere by sub half wavelength (less than 0.5λ/2, such as 0.4λ/2, for example) element spacing, difference beam steering, and extended fencing in phi=0 degree and phi=90 degree planes. One or more embodiments may provide a low elevation gain improvement using extended metallic fencing at a center of the antenna that causes the individual element pattern to tilt outwards. One or more embodiments may provide a small form factor of the array by sub half wavelength element spacing (less than 0.5λ/2), a metallic enclosure, and extended fencing at the center. One or more embodiments may result in improved mutual coupling and obtaining a better input match for the array. One or more embodiments may provide an array that has tightly coupled patches that perform in multiple beam positions. One or more embodiments may provide a lightweight design of less than 550 grams (1.2 lbs) by using three thin (less than 1.5 mm) printed circuit boards (PCB) separated by thick air gaps. One or more embodiments may include top and bottom patches that are printed on ¼th size PCB (in an XY plane) and feed traces that are printed on a full size PCB.

One or more embodiments may provide a 2×2 grid class 15, class 4, or class 16 antenna with a weight of less than 550 grams, and with a size of approximately 5.1 inches×4.5 inches×1.5 inches. One or more embodiments may provide a class 7 antenna with a weight of approximately 1.5 kilograms. One or more embodiments may provide a class 6 antenna with a weight of approximately 4.0 kilograms. One or more embodiments may provide a 3×3 grid antenna with a size of approximately 7.5 inches×7.5 inches×2.0 inches. One or more embodiments may provide a 4×4 grid antenna with a size of approximately 10 inches×10 inches×2 inches. One or more embodiments may provide a 4×4 grid antenna that may be used as a 3×3 grid antenna or a 2×2 grid antenna, and may therefore may provide a single antenna that may be used for class 6, class 7, class 15, class 4, or class 16. One or more embodiments may provide a 3×3 grid antenna that may be used as a 2×2 grid antenna.

One or more embodiments may provide a reduced size heatsink by using an extended surface for thermal dissipation using a metallic enclosure and central fencing as heat dissipation regions by natural air cooling from the sides. One or more embodiments may include a curved top fence or a flat top fence. One or more embodiments may include metallic fencing that extends downwards to a ground plane where coupling slots are etched.

One or more embodiments may include antenna elements arranged with feed elements in regular symmetry, 180° symmetry, or sequential 90° rotated configurations. One or more embodiments may include antenna elements connected to a hybrid coupler in a feed layer and further connected to a coaxial connector (one per element) to connect with the RF Printed Circuit Board Assembled (PBA), which may reduce the PCB fabrication cost for multilayer boards and which may reduce overall weight. One or more embodiments may include an on-antenna digital beam forming system implemented on a controller for a low-gain antenna without intervention from another controller, which may provide self-acquisition and self-tracking of a satellite beacon and avoid the need for external position information, such as from a global positioning system or inertial measurement unit, for example.

Other embodiments of the disclosure will be apparent to those skilled in the art from consideration of the specification and practice of the invention disclosed herein. It is intended that the specification and examples be considered as exemplary only, with a true scope and spirit of the invention being indicated by the following claims.

What is claimed is:

1. An electronically steerable antenna for L-band satellite communication, the antenna comprising:

a patch antenna including:

four antenna elements spaced apart in a patch plane to form a two-by-two grid with a spacing between each antenna element of less than a half wavelength, a ground plane, and one or more controllers configured to apply difference beam steering to the four antenna elements; and a crossed metallic fence electrically connected to the ground plane and extending through the patch plane between the four antenna elements to separate the four antenna elements into respective quadrants in the two-by-two grid, wherein the four antenna elements include a top patch plane and a bottom patch plane separated by an air gap.

2. The antenna of claim 1, wherein the antenna has greater than 4 dBi gain at a 20 degree elevation angle and greater than 1 dBi gain at a 5 degree elevation angle.

3. The antenna of claim 1, wherein the crossed metallic fence extends from the ground plane through the bottom patch plane and the top patch plane, and extends above the top patch plane.

4. The antenna of claim 1, wherein a top of the crossed metallic fence is curved.

5. The antenna of claim 1, wherein the crossed metallic fence is configured to tilt a beam of each antenna element of the four antenna elements outwards from a center of the crossed metallic fence.

6. The antenna of claim 1, wherein the crossed metallic fence is configured to dissipate heat from the four antenna elements.

7. The antenna of claim 1, wherein the four antenna elements are arranged in a sequential ninety degree rotated configuration.

8. The antenna of claim 1, wherein the one or more controllers include a tracker configured to provide self-acquisition and self-tracking of a satellite.

9. The antenna of claim 1, further comprising:
a control board, wherein the one or more controllers are on the control board.

10. The antenna of claim 9, wherein the control board further includes:
a transmitter configured to receive data to be transmitted and process the data to be transmitted for transmission by the four antenna elements, and
a receiver configured to receive a signal from the four antenna elements and process the signal as received data,
wherein the one or more controllers are configured to control the transmitter and the receiver to apply difference beam steering to the four antenna elements.

11. An electronically steerable antenna for L-band satellite communication, the antenna comprising:
a patch antenna including:
a top patch array including four top patch elements spaced apart in a top patch plane to form a top patch two-by-two grid,
a bottom patch array including four bottom patch elements spaced apart in a bottom patch plane to form a bottom patch two-by-two grid corresponding to the top patch two-by-two grid, and
a feed coupler array including four feed elements arranged in a ground plane to form a ground plane two-by-two grid corresponding to the bottom patch two-by-two grid,
wherein the top patch array, the bottom patch array, and the feed coupler array together form a two-by-two antenna array; and
a crossed metallic fence extending from the feed coupler array, through the bottom patch array between the four bottom patch elements, and through the top patch array between the top patch elements to extend above the top patch elements.

12. The antenna of claim 11,
wherein each top patch element is printed on a ¼ size printed circuit board, and
wherein each bottom patch element is printed on a ¼ size printed circuit board.

13. The antenna of claim 11,
wherein the top patch array includes nine top patch elements spaced apart in the top patch plane to form a top patch three-by-three grid,
wherein the bottom patch array includes nine bottom patch elements spaced apart in the bottom patch plane to form a bottom patch three-by-three grid corresponding to the top patch three-by-three grid,
wherein the feed coupler array includes nine feed elements arranged in the ground plane to form a ground plane three-by-three grid corresponding to the bottom patch three-by-three grid, and
wherein the top patch array, the bottom patch array, and the feed coupler array together form a three-by-three antenna array.

14. The antenna of claim 13, further comprising:
one or more controllers configured to operate the three-by-three antenna array as each of the three-by-three antenna array and the two-by-two antenna array.

15. The antenna of claim 13,
wherein the top patch array includes sixteen top patch elements spaced apart in the top patch plane to form a top patch four-by-four grid,
wherein the bottom patch array includes sixteen bottom patch elements spaced apart in the bottom patch plane to form a bottom patch four-by-four grid corresponding to the top patch four-by-four grid,
wherein the feed coupler array includes sixteen feed elements arranged in the ground plane to form a ground plane four-by-four grid corresponding to the bottom patch four-by-four grid, and
wherein the top patch array, the bottom patch array, and the feed coupler array together form a four-by-four antenna array.

16. The antenna of claim 15, further comprising:
one or more controllers configured to operate the four-by-four antenna array as each of the four-by-four antenna array, the three-by-three antenna array, and the two-by-two antenna array.

17. An electronically steerable antenna for L-band satellite communication, the antenna comprising:
four antenna elements spaced apart in a patch plane with a spacing between each antenna element of less than a half wavelength;
a crossed metallic fence extending through the patch plane between the four antenna elements to separate the four antenna elements; and
one or more controllers configured to apply difference beam steering to the four antenna elements,
wherein the antenna has a greater than 1 dBi gain at a 5 degree elevation angle, and
wherein the antenna has a greater than 4 dBi gain at a 20 degree elevation angle.

18. The antenna of claim 17, further comprising:
an extended heatsink chassis surrounding the four antenna elements in the patch plane,
wherein the crossed metallic fence and the extended heatsink chassis dissipate heat from the four antenna elements.

19. The antenna of claim 17, wherein the one or more controllers are configured to operate the antenna as each of a class 15, class 4, and class 16 antenna.

* * * * *